Jan. 1, 1952 P. T. KARLSSON 2,580,792
WIRE COILING MACHINE
Filed March 22, 1950 3 Sheets-Sheet 1

INVENTOR.
P. T. Karlsson
BY
ATTYS.

Jan. 1, 1952 P. T. KARLSSON 2,580,792
WIRE COILING MACHINE
Filed March 22, 1950 3 Sheets-Sheet 2

INVENTOR.
P. T. Karlsson
BY
ATTYS.

Jan. 1, 1952        P. T. KARLSSON        2,580,792

WIRE COILING MACHINE

Filed March 22, 1950        3 Sheets-Sheet 3

INVENTOR.

P. T. Karlsson

BY

ATTYS.

Patented Jan. 1, 1952

2,580,792

UNITED STATES PATENT OFFICE 2,580,792

WIRE-COILING MACHINE

Per T. Karlsson, Smogen, Sweden

Application March 22, 1950, Serial No. 151,080
In Sweden February 17, 1948

3 Claims. (Cl. 242—158)

The present invention relates to a simplified and improved wire-coiling machine which has means for effecting an even distribution of wires or strands on drums. A further object of the invention is to provide a machine of the type mentioned above which functions automatically and which is of a very simple and compact construction. Another object of the invention is to provide a machine of the type mentioned above which is easily adjustable to suit various demands.

The invention consists of a threaded shaft, which is intended to be rotated in one direction or the other alternately. A member cooperating with the threaded shaft will thus be moved back and forth according to the direction of rotation of the threaded shaft, said member being equipped with guides for the wire or strand which is to be distributed along the whole axial length of the drum. The invention further consists of a mechanism for automatic variation of the direction of rotation of the threaded shaft when the member cooperating with the threaded shaft is in certain end positions. Said mechanism consists of a shaft parallel with the threaded shaft and provided with flanges, which are acted upon by the said member in order to effect an axial movement of the shaft. A gear fixed to the threaded shaft is in mesh with two other gears freely rotatable on a driving shaft. In order to connect one or the other of the last mentioned gears with the driving shaft a clutch member is applied to the driving shaft to slide thereon and rotate therewith. A further axle is provided, which is rotatably journalled in the hollow threaded shaft, said axle being driven by the shaft, parallel with the threaded shaft. An eccentric or the like is furthermore carried by the shaft in the threaded part in order to move the clutch member into engagement with one or the other of the two freely rotatable gears on the driving shaft alternately.

Finally the shaft, parallel with the threaded part, and the driving shaft have such connecting means that, when the former shaft is moved to one end position, it is connected with the said driving shaft which turns the shaft in order to connect the clutch with one of the two gears of the driving shaft. When the said shaft is moved to the other end position, it is connected with the driving shaft which now turns the shaft in order to connect the clutch with the other gear of the said gears.

With these and other objects, which will become apparent from the detailed description below, the invention is more specifically described herein below and shown in the drawings in which.

Figure 1:
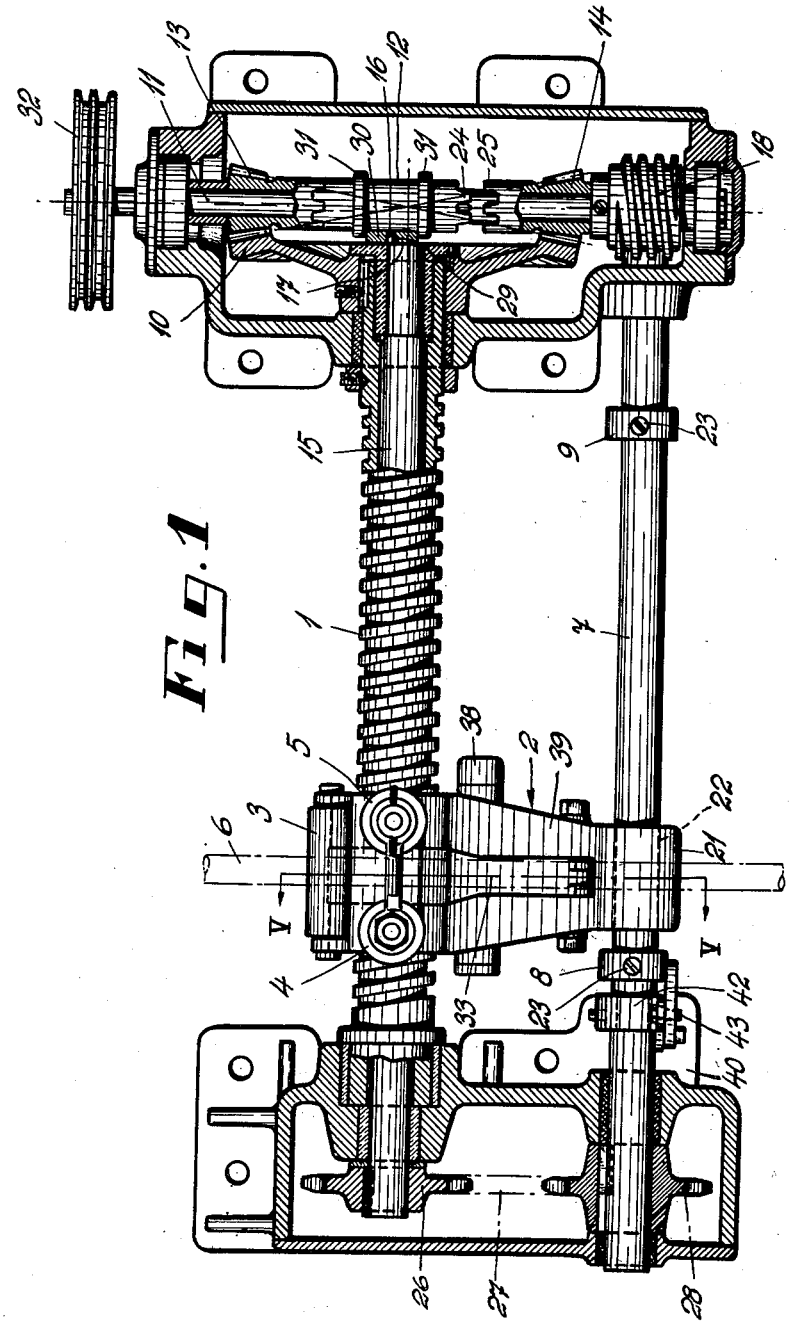
Fig. 1 is a plan view and a partial horizontal section of the invention.

A threaded shaft 1 is rotated in one direction or the other alternately and cooperates with a member 2, which is intended to carry out the even distribution of the strand or wire 6 on a drum, not shown. In order to guide the wire, the member 2 is provided with a certain number of freely rotatable rollers 3, 4 and 5. One of these rollers 3 has a horizontal axle whereas the other two rollers 4 and 5 have vertical axles, thus guiding the wire laterally. A section 21 of the member 2 has a transverse hole 22 therein through which a shaft 7 runs freely. Two of the opposite sides of the section 21 are intended to operate upon flanges 8 and 9 on the shaft 7. In the construction shown the flanges consist of two rings or collars. The rings may be secured to the shaft 7 in every appropriate axial position of adjustment by means of set screws 23.

To one end of the threaded shaft 1 there is fixed a bevel gear 10 driven by a driving shaft 11 through bevel pinions 13, 14. Said pinions 13, 14 are in mesh with the gear 10 on diametrically opposite sides of the same, and the shaft 11 is disposed perpendicular to the threaded shaft 1. The bevel pinions 13, 14 are freely rotatable on the driving shaft 11 and arranged to be separately connected with the driving shaft 11 by means of a clutch member 12. On the opposite ends of clutch member 12 there are teeth or the like 24 which alternately engage similarly shaped teeth 25 on the bevel pinions 13 and 14. The clutch member 12 is arranged on the driving shaft to slide thereon and rotate therewith. A mechanism to be hereinafter described, effects the moving of the clutch member in order to put it in mesh with one or the other of the bevel pinions 13 and 14.

A shaft 15, rotatably journalled in the hollow threaded shaft 1, is provided with a sprocket wheel 26 at one end. The wheel 26 is connected by a chain 27 with a second sprocket wheel 28 fixed on the adjacent end of the shaft 7. The sprocket wheels 26, 28 and the chain 27 constitute a drive connection between the shafts 7, 15. The other end of the shaft 15 is provided with an eccentric 16, consisting of an eccentrically arranged, cylindrical pin, extending from the end surface of the shaft 15. The pin 16 engages in an opening 29 in a forked member 30 which is rotatably arranged on the cylindrical clutch member 12 and which is disposed between two spaced flanges 31 on the said clutch member in order to prevent the displacement of the forked member 30 upon the clutch member. The shaft 7 parallel with the threaded shaft 1 is arranged to be coupled with the driving shaft 11 through a helical gear 18, which is fixed to one end of the driving shaft 11. The driving member 18 cooperates with two principally semi-circular gear segments 19, 20 which are axially displaced with regard to each other and fixed with the teeth disposed on diametrically opposite sides of the shaft 7. Furthermore, the gear segments 19, 20, which are of the same axial length, are principally displaced a distance from each other, corresponding at least to their axial length. The purpose of said arrangement is to separately connect each one of the gear segments with the driving member 18 by an axial displacement of the shaft 7 and to effect the disengaging of the driving member 18 from the two gear segments, when the shaft 7 has been turned by the driving member 18 to a certain extent corresponding to the peripheral length of one gear segment. When the shaft 7 is displaced in the opposite direction, the driving member 18 engages the other gear segment, resulting in corresponding movements.

The driving shaft 11 is driven by a motor, not shown, by means of wedge-shaped belts, cooperating with a belt pulley 32 fixed to the end of the driving shaft opposite the driving member 18.

Figure 5:
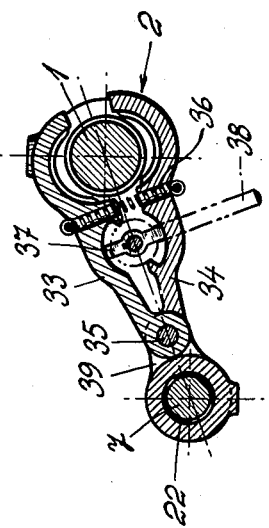
Fig. 5 is a section on the line V—V in Fig. 1.

One of the objects of this invention is to provide means for disengaging the member 2 from the threaded shaft 1 in order to effect the adjustment of every desired position with respect to the wire 6 and to the part of the wire applied to the drum. The member 2, best shown in Figs. 1 and 5, consists of two levers 33, 34 rotatably mounted with respect to each other on a pin 35 so that they may be moved to and from each other, thereby shifting the threaded parts of the levers 33, 34 into or out of engagement with the threads of the shaft 1 respectively. A spring 36 acts upon the levers 33, 34 to bring them together and an eccentric 37 or the like is intended to keep the levers apart against the action of the spring 36. The eccentric 37 is manually operated by a handle 38. The levers are journalled on the pin 35, passing between the shanks of a U-shaped bearing member 39, which is provided with the opening 22, already mentioned, for the shaft 7 and with the guiding rollers, 3, 4 and 5 for the wire. The ends of the shanks of the bearing member 39 are provided with openings through which the threaded shaft 1 can be moved freely.

Sometimes it is desirable to be able to move the shaft 7 axially in order to obtain a desired adjustment of the shaft 7 on the driving shaft 11 with regard to the driving member 18. For this purpose there is a lever 41 pivotally connected to a bottom plate 40, which transfers its pivoting movements to the shafts 7 through a fork-shaped member 42, equipped with a pin 43, cooperating with the lever 41. Thus the shaft 7 can be moved in its axial direction. The fork-shaped member 42 is rotatably connected to the shaft 7 and engages a notch therein in order to prevent an axial movement of the member 42 along the shaft. The lever 41 also indicates the axial position of the shaft 7 with respect to the driving member 18 on the shaft 11.

As it is of importance that the shaft 7 is not unintentionally acted upon in an axial direction, the opening 22 in the section 21 is of such a size, that the section 21 does not slide against the shaft 7. As moreover the member 42 is rotatably arranged with respect to the threaded shaft 1, there has to be a guide member, preventing the wall of the opening 22 from bearing against shaft 7. This guide member may be instituted by a rod 44 or the like, parallel with the shaft 7, and as shown in Fig. 2 slidably supporting the guide member.

Figure 2:
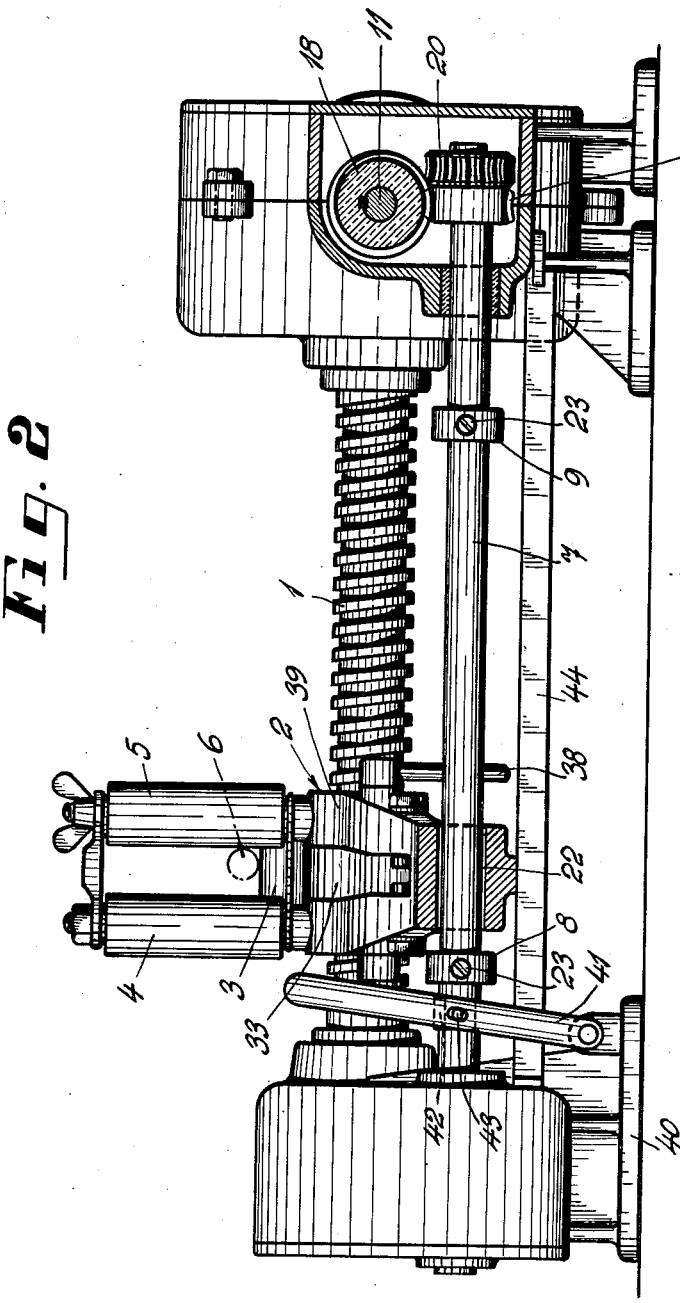
Fig. 2 is a lateral elevation partially sectioned.
Figure 3:
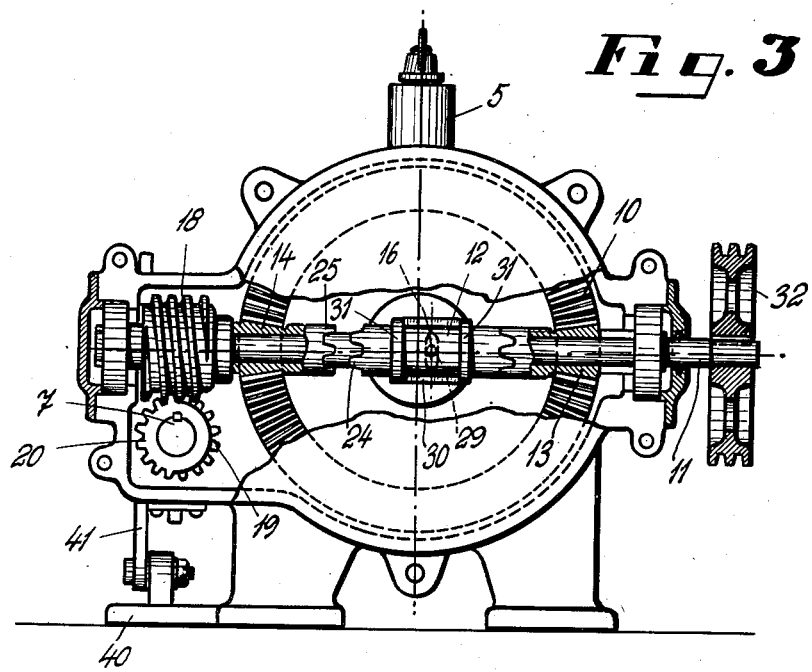
Figs. 3 and 4 are partially sectioned end views.
Figure 4:
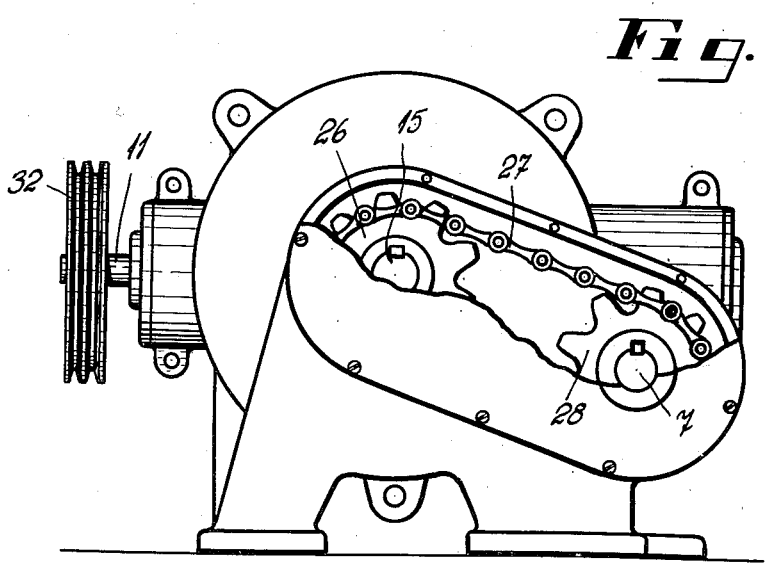

In operation, the threaded shaft turns until the member 2 is in the position shown in Figs. 1 and 2 and in such a direction that the member 2 moves to the left. When the section 21 of the member 2 hits the flange 8 on the shaft 7, the shaft moves to the left, and the gear segment 20 goes into mesh with the driving member 18 on the driving shaft 11. As the driving shaft is rotating constantly and the member 18, driving the shaft 7, is fixed to the driving shaft, the movements of the member 18 are transferred to the shaft 7, which thereby rotates clockwise as in Fig. 3. The shaft 7 rotates as long as the threads of the member 18 cooperate with the teeth of the gear segment 20, and during this time the rotation of the shaft 7 is transferred by a chain 27 to the shaft 15, rotatably journalled in the hollow, threaded shaft 1, thereby causing the shaft 15 to rotate. The gear segments 19, 20 are so dimensioned, that the turning of the shaft 15 operates the clutch member 12 by means of the eccentric 16. Thereby the clutch member 12 is moved from the pinion 13 to the pinion 14, which latter now engages the clutch member 12 and by means of this also the driving shaft 11, in order to cause the gear 10, which is now firmly connected to the threaded shaft, to rotate in the opposite direction. When the threads of the member 18 have passed the teeth of the gear segment 20, the member 18 ceases to turn the shaft 7, since the threads of the member 18 now are in the untoothed section of the gear segment 20. On account of the changed direction of rotation of the threaded member the member 2 is moved in direction of the other flange 9 of the shaft 7, and when the section 21 of the member 2 contacts this flange and moves the shaft 7, the clutch member 12 is moved into engagement with the pinion 13. This action is repeated as long as the shaft 11 rotates.

What I claim and desire to secure by Letters Patent is:

1. A winding machine for effecting an even distribution of a strand on a drum comprising a rotatable hollow externally threaded shaft, a member including guides for the strand movably cooperating with said threaded shaft to distribute the strand along a drum when said threaded shaft rotates, an externally displaced shaft parallel with said threaded shaft, flanges on said displaceable shaft with which said member cooperates to effect the axial displacement of said shaft responsive to movement of said guiding member, a gear fixed to said threaded shaft, a driving shaft, a clutch member slidably mounted on said driving shaft for rotation therewith, two pinions rotatably mounted in engagement with said gear on said driving shaft and engageable by said clutch member, an inner shaft rotatably arranged in said threaded shaft and driven by said displaceable shaft, an eccentric on one end of said inner shaft cooperable with said clutch member to move the same axially into engagement with one or the other of said pinions, and means operative responsive to movement of said displaceable shaft, to engage the same with said driving shaft to effect a driving connection between the shafts so that when the displaceable shaft is in one end position, said clutch member is connected with one of said pinions and in the other end position, said clutch member is connected with the other one of said pinions.

2. A winding machine for effecting an even distribution of a strand on a drum comprising a rotatable hollow threaded shaft, a member including guides for a strand movably cooperating with said threaded shaft to distribute a strand along a drum when said threaded shaft rotates, an axially displaceable shaft parallel with said threaded shaft, flanges on said displaceable shaft with which said member cooperates to effect the axial displacement of said shaft responsive to movement of said guiding member, an inner shaft rotatably arranged in said threaded shaft, a sprocket wheel fixed to one end of said inner shaft, another sprocket wheel fixed to one end of said displaceable shaft, a chain coupling said sprocket wheels, a driving shaft perpendicularly disposed with respect to said threaded shaft, a clutch member slidably mounted on said driving shaft for rotation therewith, a gear fixed to one end of said threaded shaft, a central opening in said gear and an eccentric on the other end of said inner shaft situated in said opening, said eccentric directly actuating said clutch member to move the same axially, two pinions rotatably arranged on said driving shaft, engaging said gear and adapted to be coupled with said clutch member, and means operative responsive to movement of said displaceable shaft to engage the same with said driving shaft to effect a driving connection between these shafts so that when said displaceable shafts are in one end position, said clutch member is connected with one of said pinions and, when in the other end position, said clutch member is connected with the other one of said pinions.

3. A winding machine for effecting an even distribution of a strand on a drum comprising a hollow threaded shaft, a member including guides for a strand cooperating with said threaded shaft to distribute a strand along a drum when said threaded shaft rotates, an axially displaceable shaft parallel with said threaded shaft, flanges on said displaceable shaft with which said member cooperates to effect the axial displacement of said shaft responsive to movement of said guiding member, a driving shaft, a driving helical gear thereon, two axially displaced and diametrically opposed gear segments on said displaceable shaft, said gear segments and said helical gear constituting a connection between said driving shaft and said displaceable shaft, an inner shaft rotatably arranged in said threaded shaft, a sprocket wheel fixed to one end of said inner shaft, another sprocket wheel fixed to one end of said displaceable shaft, a chain coupling said sprocket wheels, said driving shaft extending perpendicularly to said threaded shaft, a clutch member slidably mounted on said driving shaft for rotation therewith, a gear fixed to one end of said threaded shaft, and having a central opening therein, an eccentric on the other end of said inner shaft disposed in said opening, said eccentric directly actuating said clutch member to move the same axially of said driving shaft, two pinions rotatably arranged on said driving shaft, engaging said gear and adapted to be coupled with said clutch member, and said driving helical gear and said gear segments being operative responsive to movement of said displaceable shaft to alternately engage the latter with said driving shaft, thereby connecting said clutch member with one of said pinions in one axial position of said displaceable shaft and connecting said clutch member with the other one of said pinions in another axial position of said displaceable shaft.

PER T. KARLSSON.

REFERENCES CITED

The following references are of record in the file of this patent:

UNITED STATES PATENTS

| Number | Name | Date |
|---|---|---|
| 1,255,786 | Phillips | Feb. 5, 1918 |
| 2,259,291 | Chapman | Oct. 14, 1941 |

FOREIGN PATENTS

| Number | Country | Date |
|---|---|---|
| 23,192 | France | May 14, 1921 |// (Addition to No. 511,879.)